(12) United States Patent
Yoo et al.

(10) Patent No.: US 9,443,151 B2
(45) Date of Patent: Sep. 13, 2016

(54) APPARATUS AND METHOD FOR SEARCHING FOR WANTED VEHICLE

(71) Applicant: ELECTRONICS AND TELECOMMUNICATIONS RESEARCH INSTITUTE, Daejeon (KR)

(72) Inventors: Jang-Hee Yoo, Daejeon (KR); Jong-Gook Ko, Daejeon (KR); Jin-Woo Choi, Seoul (KR); Ki-Young Moon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 5 days.

(21) Appl. No.: 14/446,402

(22) Filed: Jul. 30, 2014

(65) Prior Publication Data

US 2015/0193662 A1  Jul. 9, 2015

(30) Foreign Application Priority Data

Jan. 7, 2014  (KR) .......................... 10-2014-0001742

(51) Int. Cl.
| | | |
|---|---|---|
| *G08G 1/123* | (2006.01) | |
| *G06K 9/00* | (2006.01) | |
| *G01S 19/14* | (2010.01) | |
| *B60R 25/30* | (2013.01) | |
| *G06Q 50/00* | (2012.01) | |
| *G08G 1/00* | (2006.01) | |
| *G01S 5/00* | (2006.01) | |

(52) U.S. Cl.
CPC ......... *G06K 9/00771* (2013.01); *B60R 25/302* (2013.01); *G01S 5/0027* (2013.01); *G01S 19/14* (2013.01); *G06Q 50/01* (2013.01); *G08G 1/205* (2013.01); *G06K 2209/15* (2013.01)

(58) Field of Classification Search
CPC .................... G06K 9/00771; G06K 2209/15; G01S 5/0027; G01S 19/14; G06Q 50/01; B60R 25/302; G08G 1/205; G08G 1/127
USPC ................ 340/989, 988, 990, 937, 901–905, 340/932.2, 5.53, 5.7, 5.83, 425.5; 455/404.1, 431; 382/103, 105
See application file for complete search history.

(56) References Cited

U.S. PATENT DOCUMENTS

| | | | |
|---|---|---|---|
| 7,003,278 B2 * | 2/2006 | Beni | ...................... G01S 5/0072 340/988 |
| 2005/0073436 A1 * | 4/2005 | Negreiro | ................ G08G 1/017 340/937 |

(Continued)

FOREIGN PATENT DOCUMENTS

| | | |
|---|---|---|
| KR | 10-2006-0114825 | 11/2006 |
| KR | 10-2013-0106640 | 9/2013 |
| WO | WO 2013/111993 A1 | 8/2013 |

*Primary Examiner* — Anh V La
(74) *Attorney, Agent, or Firm* — Staas & Halsey LLP

(57) ABSTRACT

Disclosed herein is an apparatus and method of searching for a wanted vehicle, capable of interoperating with black boxes mounted in vehicles of unspecified individuals, recognizing and searching for registration numbers of vehicles in proximity of each black box in real time, and identifying a location of the wanted vehicle in real time using information about locations of the searched vehicles. The method includes requesting, by an apparatus for searching for a wanted vehicle, a black box installed in at least one vehicle to search for a registration number of the wanted vehicle, and receiving a response corresponding to the request, and acquiring information about the wanted vehicle and a location of the wanted vehicle corresponding to the response using the black box for recognizing a vehicle registration number or the black box for detecting a vehicle registration number region.

11 Claims, 3 Drawing Sheets

(56) References Cited

U.S. PATENT DOCUMENTS

| | | |
|---|---|---|
| 2010/0030540 A1 | 2/2010 | Choi et al. |
| 2012/0081544 A1* | 4/2012 | Wee ............... G01S 17/023 348/140 |
| 2012/0146809 A1* | 6/2012 | Oh .................. G08G 1/205 340/901 |
| 2014/0355835 A1* | 12/2014 | Rodriguez-Serrano .. G06K 9/72 382/105 |

* cited by examiner

APPARATUS AND METHOD FOR SEARCHING FOR WANTED VEHICLE

CROSS REFERENCE TO RELATED ED APPLICATION(S)

This application claims the benefit of Korean Patent Application No. 10-2014-0001742, filed on Jan. 7, 2014, which is hereby incorporated by reference in its entirety into this application.

BACKGROUND OF THE INVENTION

1. Technical Field

The present invention relates generally to an apparatus and method for searching for a wanted vehicle and, more particularly, to an apparatus and method for searching for a wanted vehicle, capable of interoperated with black boxes mounted in vehicles of unspecified individuals, recognizing and searching for registration numbers of vehicles in proximity of each black box in real time, and identifying a location of the wanted vehicle in real time using information about locations of the searched vehicles.

2. Description of the Related Art

Current technologies for recognizing license plates of vehicles are used for various application services such as searching for stolen vehicles and criminal vehicles, and parking management. Further, as black boxes for vehicles are becoming common, the black boxes installed in the vehicles can continue to record the front or rear conditions of the vehicle during traveling, and recorded images are helpful in revealing the facts in the event of traffic accidents. In this way, black boxes for vehicles are evolving into tools capable of supporting various services such as global positioning system (GPS) service, vehicle safe driving support, and so on.

Further, smart services for the vehicle, such as safety security, diagnosis, remote control, remote start, air conditioner control, remote door opening/closing, and parking location confirmation, provided at a remote place using a communication network based on an advanced information technology (IT) system have been developed and are currently used.

Currently, to search for a wanted vehicle, use is made of a method of stopping the wanted vehicle at a checkpoint by automatically recognizing license plates of vehicles passing through a road using a vehicle license plate recognition system installed on the road, comparing the recognized results with data of wanted vehicles, and transmitting information about the wanted vehicle. In another method, the registration number of a vehicle that is parked or is traveling is recognized using a vehicle license plate recognition system mounted on a police vehicle, thereby automatically searching for a wanted vehicle. For example, an "apparatus for tracing wanted culprits and missing persons using image recognition and a method thereof" disclosed in Korean Patent Application Publication No. 10-2013-0106640 are adapted to be able to trace wanted culprits and missing persons by configuring a black box of a vehicle into an ambush mode during parking, thereby identifying faces of pedestrians, and sending a text message to a vehicle owner or recognition information to registered public agencies when a recognized target is present.

However, in these methods, the number of installed or mounted vehicle license plate recognition systems is significantly deficient to allow a search for the wanted vehicle in a very restricted region. Further, it is difficult to trace the location of the wanted vehicle in real time.

In connection with this, Korean Patent Application Publication No. 10-2013-0106640 discloses a technology related to "Apparatus and Method for Controlling traffic."

SUMMARY OF THE INVENTION

Accordingly, the present invention has been made keeping in mind the above problems occurring in the prior art, and an object of the present invention is to provide a technique for effectively searching for a wanted vehicle in real time through crowd sourcing associated with black boxes installed in vehicles of unspecified individuals.

Another object of the present invention is to provide an apparatus and method of searching for a wanted vehicle, capable of interoperating with black boxes mounted in vehicles of unspecified individuals, recognizing and searching for registration numbers of vehicles in proximity of the black boxes in real time, and identifying a location of a wanted vehicle in real time using information about locations of the searched vehicles.

In order to accomplish the above objects, the present invention provides a method of searching for a wanted vehicle, which includes: requesting, by an apparatus for searching for a wanted vehicle, a black box installed in at least one vehicle to search for the registration number of the wanted vehicle, and receiving a response corresponding to the request; and acquiring information about the wanted vehicle and a location of the wanted vehicle corresponding to the response using the vehicle registration number recognizing black box or the vehicle registration number region detecting black box.

Here, the receiving of the response may include determining whether the response is a response transmitted by the vehicle registration number recognizing black box that has a function of recognizing the vehicle registration number or a response transmitted by the vehicle registration number region detecting black box that has a function of detecting the vehicle registration number region.

Further, if a result of the determination corresponds to the response transmitted by the vehicle registration number recognizing black box, the acquiring of the information about the wanted vehicle and the location of the wanted vehicle may include: transmitting the registration number of the wanted vehicle to the vehicle registration number recognizing black box; receiving information about a location of the wanted vehicle from the vehicle registration number recognizing black box; and displaying the registration number and location information of the wanted vehicle.

Also, the method may further includes, after the registration number of the wanted vehicle is transmitted to the vehicle registration number recognizing black box, recognizing, by the vehicle registration number recognizing black box, the vehicle registration number in the vehicle registration number region detected from an image of another vehicle captured in front or back of the vehicle in real time, and comparing the registration number of the wanted vehicle with the recognized vehicle registration number, and determining that the vehicle having the recognized vehicle registration number is the wanted vehicle if the recognized vehicle registration number corresponds to the registration number of the wanted vehicle.

Meanwhile, if a result of the determination corresponds to the response transmitted by the vehicle registration number region detecting black box, the acquiring of the information about the wanted vehicle and the location of the wanted vehicle may include: requesting the vehicle registration number region detecting black box to detect the vehicle registration number region; receiving the vehicle registration number region corresponding to the request, and recognizing the vehicle registration number in the received vehicle registration number region; checking whether or not the recognized vehicle registration number is identical to the registration number of the wanted vehicle; and if the recognized vehicle registration number is identical to the registration number of the wanted vehicle, displaying information about a location of the vehicle having the recognized vehicle registration number.

In addition, the wanted vehicle searching apparatus and at least one black box may perform bidirectional communication.

Further, the present invention provides an apparatus for searching for a wanted vehicle, which includes: a black box interoperated controller configured to request a black box installed in at least one vehicle to search for the registration number of a wanted vehicle, to receive a response corresponding to the request, and to control the vehicle registration number recognizing black box or the vehicle registration number region detecting black box to cooperate with the black box; and a receiver configured to receive information about a location of the vehicle determined to be the wanted vehicle from the vehicle registration number recognizing black box or the vehicle registration number region detecting black box as a result of the control of the black box interoperated controller.

Here, the apparatus may further include a transmitter configured to transmit the registration number of the wanted vehicle to the vehicle registration number recognizing black box if the response received by the black box interoperated controller corresponds to a response transmitted by the vehicle registration number recognizing black box that has a function of recognizing the vehicle registration number.

Further, the vehicle registration number recognizing black box receiving the registration number of the wanted vehicle may recognize the vehicle registration number in the vehicle registration number region detected from an image of another vehicle captured in front or back of the vehicle, compare the registration number of the wanted vehicle with the recognized vehicle registration number, and determine that the vehicle having the recognized vehicle registration number is the wanted vehicle if the recognized vehicle registration number corresponds to the registration number of the wanted vehicle.

Further, the apparatus may further include, if the response received by the black box interoperated controller corresponds to a response transmitted by the vehicle registration number region detecting black box that has a function of detecting the vehicle registration number region inclusive of the vehicle registration number, a number image receiver configured to receive the vehicle registration number region from the vehicle registration number region detecting black box, a number recognizing part configured to recognize the vehicle registration number in the vehicle registration number region received by the number image receiver, a number storage part configured to include the registration numbers of the wanted vehicles, and a number searching part configured to search whether or not the identical vehicle registration number as the recognized vehicle registration number is present in the registration numbers of the wanted vehicles stored in the number storage part.

In addition, the number searching part may determine that the vehicle having the identical vehicle registration number is the wanted vehicle if the identical vehicle registration number as the recognized vehicle registration number is present in the registration numbers of the wanted vehicles stored in the number storage part.

According to the present invention, the apparatus and method of searching for a wanted vehicle can effectively search for and trace the wanted vehicle at a remote server using large-scale functional black boxes mounted in vehicles through crowd sourcing based on control interoperating with the functional black boxes. Vehicles that are parked or traveling as well as criminal vehicles that are traveling can be checked with respect to their locations in real time, so that a system for searching for a criminal vehicle in real time can be improved in efficiency. In other words, the present invention can analyze and recognize an image acquired by a black box for a vehicle having a function of detecting or recognizing registration numbers of vehicles of unspecified individuals and a location recognition and communication function such as a GPS in real time, search for the registration number of the wanted vehicle, and when the wanted vehicle is searched for, transmit location information to a server for searching for the wanted vehicle, a control center, or surrounding police vehicles, so that the wanted vehicle can be rapidly effectively searched for by making efficient use of large-scale external resources.

Further, the present invention can effectively widen application fields of existing vehicle registration number recognition system and black box, establish a more powerful system for searching for a wanted vehicle, and thus greatly contribute to development of technologies involved in advanced security services.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
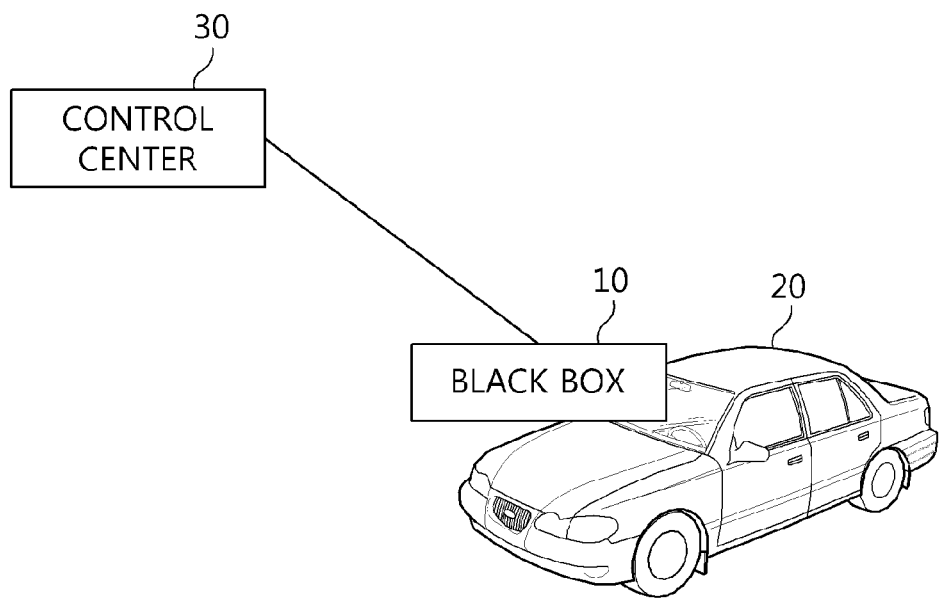
FIG. 1 illustrates a relation between a vehicle mounted with a black box having a function of recognizing registration numbers of other vehicles and a control center.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Currently various black boxes are being developed and distributed rapidly. Various efforts to enhance performance of these black boxes, such as adding a safe driving support function along with improvement in resolution of a black box camera have become an important issue.

The present invention has been devised to provide a method of searching for a wanted vehicle in real time by offering a black box for a vehicle a function of detecting or recognizing registration numbers of other vehicles and a communication function so as to allow a server for managing and searching for the registration numbers of the vehicles to perform interlocking control and communication with large-scale black boxes from a distance.

Hereinafter, an apparatus and method of searching for a wanted vehicle according to an exemplary embodiment of the present invention will be described in detail with reference to the accompanying drawings.

FIG. 1 illustrates a relation between a vehicle mounted with a black box having a function of recognizing registration numbers of other vehicles and a control center.

In FIG. 1, a wanted vehicle is searched for using an interlocking scenario between a vehicle 20 that is mounted with a black box 10 having a function of recognizing registration numbers of other vehicles and is traveling on a road and a server (not shown) of a control center 30 which manages and searches for the registration numbers of the vehicles.

Referring to FIG. 1, the black box 10 has a function of acquiring location information using a global positioning system (GPS) per se or a communication network and a function of enabling bidirectional radio communication with a corresponding server (a control server corresponding to the control center 30) through a communication module.

The control center 30 needs to cope with sending information about a wanted vehicle to the black box 10 in real time, and the black box 10 can secure location information in real time when searching for the wanted vehicle.

Generally, the black box 10 installed in a vehicle captures images of other vehicles in front or back of the vehicle in real time and stores information about the captured vehicle images. As such, when the control center 30 makes a request to identify registration numbers of the vehicles, the black box 10 can immediately cope with the request in real time.

Next, an environment to which the apparatus for searching for a wanted vehicle is applied will be described in detail with reference to FIG. 2.

Figure 2:
FIG. 2 illustrates the environment to which the apparatus for searching for a wanted vehicle according to the embodiment of the present invention is applied.

FIG. 2 illustrates the environment to which the apparatus for searching for a wanted vehicle according to the embodiment of the present invention is applied.

Referring to FIG. 2, the apparatus 100 for searching for a wanted vehicle cooperates with a black box 200 for recognizing a vehicle registration number or a black box 300 for detecting a vehicle registration number region.

To be specific, the apparatus 100 for searching for a wanted vehicle requests black boxes installed in vehicles of unspecified individuals to search for the registration number of the wanted vehicle, and receives a response corresponding to the request. Here, the received response corresponds to either a response transmitted by the vehicle registration number recognizing black box 200 that has a function of recognizing the vehicle registration number or a response transmitted by the vehicle registration number region detecting black box 300 that has a function of detecting the vehicle registration number region inclusive of the vehicle registration number.

When receiving the response transmitted by the vehicle registration number recognizing black box 200, the apparatus 100 for searching for a wanted vehicle transmits the registration number of the wanted vehicle to the vehicle registration number recognizing black box 200, and receives information about a location of the wanted vehicle.

When receiving the response transmitted by the vehicle registration number region detecting black box 300, the apparatus 100 for searching for a wanted vehicle receives the vehicle registration number region from the vehicle registration number region detecting black box 300, and recognizes the vehicle registration number in the vehicle registration number region. Next, the apparatus 100 for searching for a wanted vehicle checks whether or not the recognized vehicle registration number corresponds to the registration number of the wanted vehicle, and displays information about a location of the wanted vehicle registration number.

Then, constitutions of the apparatus for searching for a wanted vehicle, the black box for recognizing a vehicle registration number, and the black box for detecting a vehicle registration number region will be described in detail with reference to FIG. 3.

Figure 3:
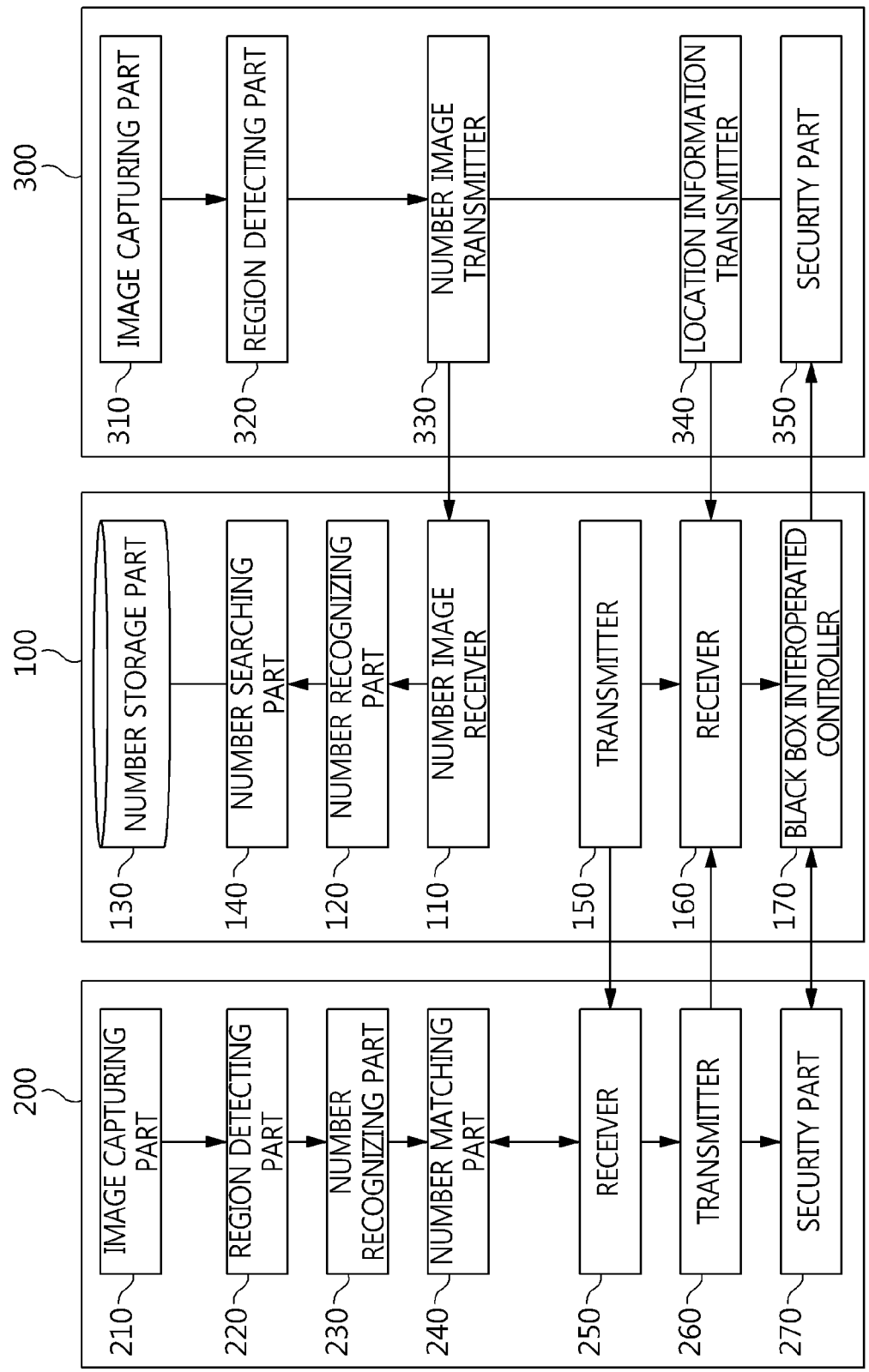
FIG. 3 illustrates the constitutions of the apparatus for searching for a wanted vehicle, a black box for recognizing a vehicle registration number, and a black box for detecting a vehicle registration number region.

FIG. 3 illustrates the constitutions of the apparatus for searching for a wanted vehicle, a black box for recognizing a vehicle registration number, and a black box for detecting a vehicle registration number region.

Referring to FIG. 3, the vehicle registration number recognizing black box 200 includes an image capturing part 210, a region detecting part 220, a number recognizing part 230, a number matching part 240, a receiver 250, a transmitter 260, and a security part 270.

The image capturing part 210 captures images of vehicles in front or back of the vehicle in which the black box is installed in real time.

The region detecting part 220 detects a region inclusive of a vehicle registration number, i.e. a vehicle registration number region, from the image captured by the image capturing part 210.

The number recognizing part 230 recognizes the vehicle registration number in the vehicle registration number region detected by the region detecting part 220.

The number matching part 240 compares the registration number of the wanted vehicle received from the receiver 250 with the registration number recognized by the number recognizing part 230, and checks whether or not the compared registration numbers are identical. If the registration number recognized by the number recognizing part 230 corresponds to the registration number of the wanted vehicle, the number matching part 240 determines that the vehicle having the recognized registration number is the wanted vehicle.

The receiver 250 receives the registration number of the wanted vehicle from the apparatus 100 for searching for a wanted vehicle. Further, the receiver 250 may receive a request to search for the registration number of the wanted vehicle from the apparatus 100 for searching for a wanted vehicle.

As a result of the number matching part 240 comparing the registration number of the wanted vehicle with the registration number recognized by the number recognizing part 230, if the compared registration numbers are identical to each other, the transmitter 260 transmits information about a location of a vehicle, in which the black box recognizing the registration number is mounted, to the apparatus 100 for searching for a wanted vehicle. Here, the transmitter 260 may include a GPS in order to acquire information about a location of a vehicle. Further, to acquire the location information, a mobile communication network other than the GPS may be used.

The security part 270 controls interoperation with the apparatus 100 for searching for a wanted vehicle.

The black box 300 for detecting a vehicle registration number region includes an image capturing part 310, a region detecting part 320, a number image transmitter 330, a location information transmitter 340, and a security part 350.

The image capturing part 310 captures images of vehicles in front or back of the vehicle in which the black box is installed in real time.

The region detecting part 320 detects a region inclusive of a vehicle registration number, i.e. a vehicle registration number region, from the image captured by the image capturing part 210.

The number image transmitter 330 transmits the vehicle registration number region detected by the region detecting part 320 to the apparatus 100 for searching for a wanted vehicle.

The location information transmitter 340 transmits information about a location of a vehicle, in which the black box whose region detecting part 320 detects the vehicle registration number region is mounted, to the apparatus 100 for searching for a wanted vehicle.

The security part 350 controls interoperation with the apparatus 100 for searching for a wanted vehicle.

The apparatus 100 for searching for a wanted vehicle includes a number image receiver 110, a number recognizing part 120, a number storage part 130, a number searching part 140, a transmitter 150, a receiver 160, and a black box interoperated controller 170.

The number image receiver 110 receives a vehicle registration number region from the vehicle registration number region detecting black box 300.

The number recognizing part 120 recognizes a vehicle registration number in the vehicle registration number region received from the number image receiver 110.

The number storage part 130 includes registration numbers of wanted vehicles associated with crimes, thefts, and so on.

The number searching part 140 searches whether or not the same registration number as the vehicle registration number recognized by the number recognizing part 120 is present in the registration numbers of wanted vehicles stored in the number storage part 130. Next, if the same registration number as the vehicle registration number recognized by the number recognizing part 120 is present in the registration numbers of wanted vehicles stored in the number storage part 130, the number searching part 140 displays the recognized vehicle registration number and location information.

When receiving a response transmitted by the vehicle registration number recognizing black box 200 which has a function of recognizing the vehicle registration number, the transmitter 150 transmits the registration number of the wanted vehicle to the vehicle registration number recognizing black box 200.

The receiver 160 receives location information of a vehicle determined to be a wanted vehicle from the vehicle registration number recognizing black box 200 or the vehicle registration number region detecting black box 300.

The black box interoperated controller 170 requests the black boxes installed in vehicles of unspecified individuals to search for the registration number of the wanted vehicle, and receives a response corresponding to the request, thereby controls the vehicle registration number recognizing black box 200 or the vehicle registration number region detecting black box 300 to cooperate with the black box corresponding to the response. Here, the response corresponds to either a response transmitted by the vehicle registration number recognizing black box 200 which has a function of recognizing the vehicle registration number or a response transmitted by the vehicle registration number region detecting black box 300 which has a function of detecting the vehicle registration number region inclusive of the vehicle registration number.

Next, a method of searching for a wanted vehicle will be described in detail with reference to FIG. 4.

Figure 4:
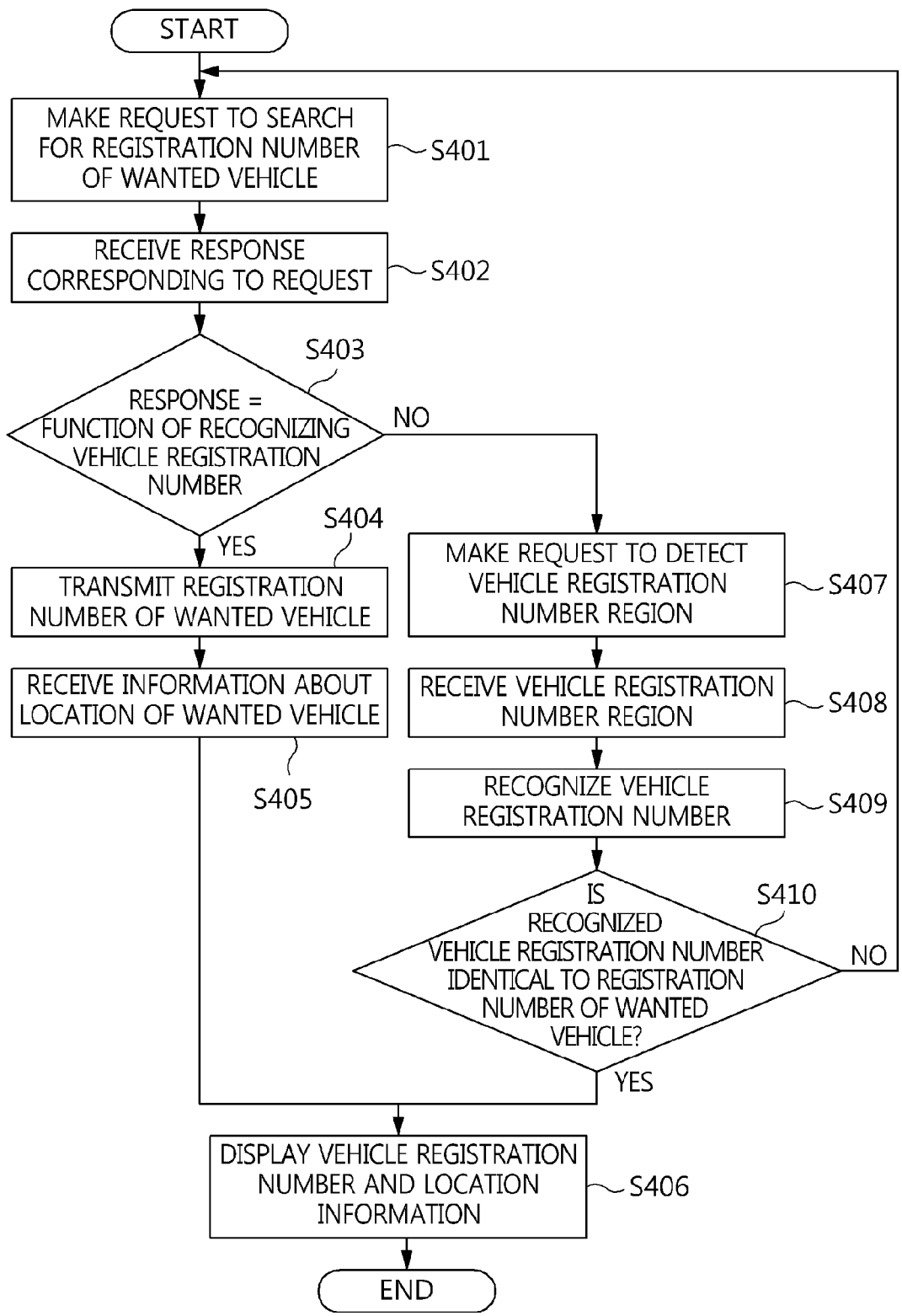
FIG. 4 is a flow chart illustrating a method of searching for a wanted vehicle according to an embodiment of the present invention.

FIG. 4 is a flow chart illustrating a method of searching for a wanted vehicle according to an embodiment of the present invention.

Referring to FIG. 4, the apparatus 100 for searching for a wanted vehicle requests black boxes installed in vehicles of unspecified individuals to search for the registration number of the wanted vehicle (S401).

The apparatus 100 for searching for a wanted vehicle receives a response corresponding to the request to search for the registration number of the wanted vehicle (S402). Here, the response received in step S402 may correspond to either a response transmitted by the vehicle registration number recognizing black box 200 which has a function of recognizing the vehicle registration number or a response transmitted by the vehicle registration number region detecting black box 300 which has a function of detecting the vehicle registration number region inclusive of the vehicle registration number.

The apparatus 100 for searching for a wanted vehicle determines whether or not the response received in step S402 is the response transmitted by the black box having a function of recognizing the vehicle registration number, i.e. the vehicle registration number recognizing black box 200 (S403).

If a result of the determination in step S403 corresponds to the response transmitted by the vehicle registration number recognizing black box 200, the apparatus 100 for searching for a wanted vehicle transmits the registration number of the wanted vehicle to the vehicle registration number recognizing black box 200 (S404).

In this case, the vehicle registration number recognizing black box 200 recognizes the vehicle registration number in a vehicle registration number region detected from an image obtained by capturing the front or rear of the vehicle. Next, the vehicle registration number recognizing black box 200 compares the registration number of the wanted vehicle received in step S404 with the recognized vehicle registration number. If the recognized vehicle registration number corresponds to the registration number of the wanted vehicle, it is determined that the vehicle having the recognized vehicle registration number is the wanted vehicle. Then, the vehicle registration number recognizing black box 200 transmits information about a location of the vehicle having the recognized vehicle registration number to the apparatus 100 for searching for a wanted vehicle.

The apparatus 100 for searching for a wanted vehicle receives the location information of the wanted vehicle from the vehicle registration number recognizing black box 200 (S405). The apparatus 100 for searching for a wanted vehicle displays the registration number and location information of the wanted vehicle (S406).

If a result of the determination in step S403 corresponds to the response transmitted by the vehicle registration number region detecting black box 300, the apparatus 100 for searching for a wanted vehicle requests the vehicle registration number region detecting black box 300 to detect the vehicle registration number region (S407).

The apparatus 100 for searching for a wanted vehicle receives the vehicle registration number region corresponding to the request of step S407 (S408), and recognizes the vehicle registration number in the received vehicle registration number region (S409).

The apparatus 100 for searching for a wanted vehicle checks whether or not the vehicle registration number recognized in step S409 is identical to the registration number of the wanted vehicle (S410).

If the vehicle registration number recognized in step S409 is identical to the registration number of the wanted vehicle, the apparatus 100 for searching for a wanted vehicle displays the recognized vehicle registration number and the location information of the vehicle having the recognized vehicle registration number (S406).

In this way, the present invention can analyze and recognize an image acquired by a black box for a vehicle having a function of detecting or recognizing registration numbers of vehicles of unspecified individuals and a location recognition and communication function such as a GPS in real time, search for the registration number of a wanted vehicle, and when the wanted vehicle is searched for, transmit location information to a server for searching for the wanted vehicle, a control center, or surrounding police vehicles, so that the wanted vehicle can be rapidly effectively searched for by making efficient use of large-scale external resources.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A method of searching for a wanted vehicle, comprising:
   requesting, by an apparatus for searching for a wanted vehicle, a black box installed in at least one vehicle belonging to an unspecified individual to search for a registration number of the wanted vehicle, and receiving a response corresponding to the request; and
   acquiring information about the wanted vehicle and a location of the wanted vehicle corresponding to the response using a vehicle registration number recognized by the black box or a vehicle registration number region detected by the black box.

2. The method as set forth in claim 1, wherein the receiving of the response comprises determining whether the response is a response transmitted by the vehicle registration number recognizing black box that has a function of recognizing the vehicle registration number or a response transmitted by the vehicle registration number region detecting black box that has a function of detecting the vehicle registration number region.

3. The method as set forth in claim 2, wherein, if a result of the determination corresponds to the response transmitted by the vehicle registration number recognizing black box, the acquiring of the information about the wanted vehicle and the location of the wanted vehicle comprises:
   transmitting the registration number of the wanted vehicle to the vehicle registration number recognizing black box;
   receiving information about a location of the wanted vehicle from the vehicle registration number recognizing black box; and
   displaying the registration number and location information of the wanted vehicle.

4. The method as set forth in claim 3, comprising, after the registration number of the wanted vehicle is transmitted to the vehicle registration number recognizing black box,
   recognizing, by the vehicle registration number recognizing black box, the vehicle registration number in the vehicle registration number region detected from an image of another vehicle captured in front or back of the vehicle in real time, and
   comparing the registration number of the wanted vehicle with the recognized vehicle registration number, and determining that the vehicle having the recognized vehicle registration number is the wanted vehicle if the recognized vehicle registration number corresponds to the registration number of the wanted vehicle.

5. The method as set forth in claim 2, wherein, if a result of the determination corresponds to the response transmitted by the vehicle registration number region detecting black box, the acquiring of the information about the wanted vehicle and the location of the wanted vehicle comprises:
   requesting the vehicle registration number region detecting black box to detect the vehicle registration number region;
   receiving the vehicle registration number region corresponding to the request, and recognizing the vehicle registration number in the received vehicle registration number region;
   checking whether or not the recognized vehicle registration number is identical to the registration number of the wanted vehicle; and
   if the recognized vehicle registration number is identical to the registration number of the wanted vehicle, displaying information about a location of the vehicle having the recognized vehicle registration number.

6. The method as set forth in claim 1, wherein the wanted vehicle searching apparatus and at least one black box perform bidirectional communication.

7. An apparatus for searching for a wanted vehicle, comprising:
   a black box interoperated controller configured to request a black box installed in at least one vehicle belonging to an unspecified individual to search for a registration number of the wanted vehicle, to receive a response corresponding to the request, and to control a vehicle registration number recognized by the black box or a vehicle registration number region detected by the black box to cooperate with the black box; and
   a receiver configured to receive information about a location of the vehicle turned out to be the wanted vehicle from a vehicle registration number recognizing black box or a vehicle registration number region detecting black box as a result of the control of the black box interoperated controller.

8. The apparatus as set forth in claim 7, further comprising a transmitter configured to transmit the registration number of the wanted vehicle to the vehicle registration number recognizing black box if the response received by the black box interoperated controller corresponds to a response transmitted by the vehicle registration number recognizing black box that has a function of recognizing the vehicle registration number.

9. The apparatus as set forth in claim 8, wherein the vehicle registration number recognizing black box receiving the registration number of the wanted vehicle is configured to recognize the vehicle registration number in the vehicle registration number region detected from an image of another vehicle captured in front or back of the vehicle in real time, to compare the registration number of the wanted vehicle with the recognized vehicle registration number, and to determine that the vehicle having the recognized vehicle registration number is the wanted vehicle if the recognized vehicle registration number corresponds to the registration number of the wanted vehicle.

10. The apparatus as set forth in claim 7, further comprising, if the response received by the black box interoperated controller corresponds to a response transmitted by the vehicle registration number region detecting black box that has a function of detecting the vehicle registration number region inclusive of the vehicle registration number, a number image receiver configured to receive the vehicle registration number region from the vehicle registration number region detecting black box, a number recognizing part configured to recognize the vehicle registration number in the vehicle registration number region received by the number image receiver, a number storage part configured to include the registration numbers of the wanted vehicles, and a number searching part configured to search whether or not the identical vehicle registration number as the recognized vehicle registration number is present in the registration numbers of the wanted vehicles stored in the number storage part.

11. The apparatus as set forth in claim 10, wherein the number searching part determines that the vehicle having the identical vehicle registration number is the wanted vehicle if the identical vehicle registration number as the recognized vehicle registration number is present in the registration numbers of the wanted vehicles stored in the number storage part.

* * * * *